(12) United States Patent
Kim

(10) Patent No.: US 9,157,472 B2
(45) Date of Patent: Oct. 13, 2015

(54) THRUST FOIL AIR BEARING

(75) Inventor: Kyeong Su Kim, Daejeon (KR)

(73) Assignee: Neuros Co., Ltd., Daejeon (KR)

( * ) Notice: Subject to any disclaimer, the term of this patent is extended or adjusted under 35 U.S.C. 154(b) by 250 days.

(21) Appl. No.: 13/497,651

(22) PCT Filed: Oct. 7, 2010

(86) PCT No.: PCT/KR2010/006864
§ 371 (c)(1),
(2), (4) Date: Mar. 22, 2012

(87) PCT Pub. No.: WO2011/043607
PCT Pub. Date: Apr. 14, 2011

(65) Prior Publication Data
US 2012/0207414 A1      Aug. 16, 2012

(30) Foreign Application Priority Data
Oct. 7, 2009   (KR) .................. 10-2009-0094963

(51) Int. Cl.
*F16C 32/06* (2006.01)
*F16C 17/04* (2006.01)
(52) U.S. Cl.
CPC .................... *F16C 17/042* (2013.01)
(58) Field of Classification Search
CPC .................................................... F16C 17/042
USPC ................. 384/103, 105, 106, 107, 121, 124
See application file for complete search history.

(56) References Cited

U.S. PATENT DOCUMENTS

| 4,082,375 | A | | 4/1978 | Fortmann | |
|---|---|---|---|---|---|
| 4,277,112 | A | | 7/1981 | Heshmat | |
| 4,462,700 | A | | 7/1984 | Agrawal | |
| 4,597,677 | A | | 7/1986 | Hagiwara et al. | |
| 5,110,220 | A | * | 5/1992 | Gu | 384/105 |
| 5,248,205 | A | * | 9/1993 | Gu et al. | 384/106 |
| 2002/0067872 | A1 | | 6/2002 | Weissert | |
| 2011/0243485 | A1 | * | 10/2011 | Kume et al. | 384/106 |

FOREIGN PATENT DOCUMENTS

JP         2684765 B2 *  12/1997  ............ F16C 17/042
KR   10-2099-0060661 A      6/2009

OTHER PUBLICATIONS

"Trigonometry". Retrieved from http://en.wikipedia.org/wiki/Trigonometry on Jun. 6, 2013.*
International Search Report for PCT/KR2010/006864, dated Jun. 30, 2011.
European Search Report for EP Patent Application No. 10822252.2, dated Sep. 13, 2012.

* cited by examiner

*Primary Examiner* — Thomas R. Hannon
(74) *Attorney, Agent, or Firm* — Bachman & LaPointe, P.C.

(57) ABSTRACT

A thrust foil air bearing has a bump foil arranged on a thrust plate. A top foil includes a flat surface extending along top bumps of the bump foil, an edge attached to the thrust plate, and a ramp connecting the edge and the flat surface. The ramp forms a curvature. The curvature has a center located in a lower part of the ramp and tangentially contacts the top of a first bump of the bump foil.

2 Claims, 4 Drawing Sheets

THRUST FOIL AIR BEARING

BACKGROUND OF THE INVENTION

The present invention relates to a thrust foil air bearing, and more particularly to a thrust foil air bearing which can enhance the load capacity. The present invention provides a ramp of top foils to generate uniformly distributed and higher pressure inside the bearing without excessive pressure change or drop in the rotational direction of a bearing disc so that the total pressure in the bearing increases and the load capacity is improved.

A foil air bearing is a bearing which supports loads by air pressure generated by the incoming air having viscosity between a rotor or a bearing disc and a foil structure contacting therewith at high speed rotation of the rotor.

With reference to FIGS. 1 and 2, a thrust foil air bearing 100 is provided with a thrust plate 60, and a bump foil 80 is arranged thereon and a top foil 90 is disposed along the top of the bump foil 60. An edge 94 of the top foil 90 is attached to the thrust plate 60 and the top foil 90 is extended along the top of a bump 8 of the bump foil 80 through a ramp 99.

When a bearing disc 20 rotates together with a rotor 10, air having viscosity flows in along the ramp 99 of the top foil 90 and pressure is formed between the top foil 90 and the disc 20. The pressure formed there between supports the loads.

With reference to FIG. 3, in general, the ramp 99 of the top foil is straight or assigned an arbitrary shape adaptable for easy production. In this case, the pressure increases sharply at A where the ramp terminates, however, the pressure falls down in the area B due to the side leakage effect caused by increased pressure at A. As a result, total pressure decreases and the load capacity reduces.

The load capacity is determined by the total air pressure formed in the bearing and it is necessary to raise the integrated total air pressure not the peak value. The present invention provides a novel and unique ramp structure which can raise the total air pressure and increase the load capacity.

SUMMARY OF THE INVENTION

A purpose of the present invention is to provide a thrust foil air bearing having a ramp structure which can increase the total air pressure therein and enhance the load capacity.

The present invention provides a thrust foil air bearing comprising a bump foil arranged on a thrust plate; a top foil an edge of which is attached to the thrust plate, the top foil extending along top of bumps of the bump foil and having a ramp formed between the edge and a first bump of the bump foil; wherein the ramp forms a curvature the center of which is located in the lower part thereof and extends tangentially to the flat surface of the top foil, the curvature being determined by the following equation.

$$\theta_B = \tan^{-1}\left(\frac{x_B}{R_T - h_B}\right)$$

$\theta_B$: Curvature
$x_B$: Offset distance between the both ends of the top foil curvature
$R_T$: Radius of the curvature
$h_B$: Height of the bump foil.

According to the present invention, if a horizontal contact line connecting the points where the top foil contacts tangentially with the first bump of the bump foil is not parallel to an edge line connecting the end points toward the bump foil at the edge of the top foil, the $x_B$ is determined by the horizontal distance of a curve between the edge line and an edge parallel contact line which is parallel to the edge line and contacts with the horizontal contact line.

The present invention provides a thrust foil air bearing having a ramp structure which can increase the total air pressure therein and enhance the load capacity.

DETAILED DESCRIPTION

The preferred embodiment of the present invention will be described with reference to the accompanying drawings.

Figure 1:
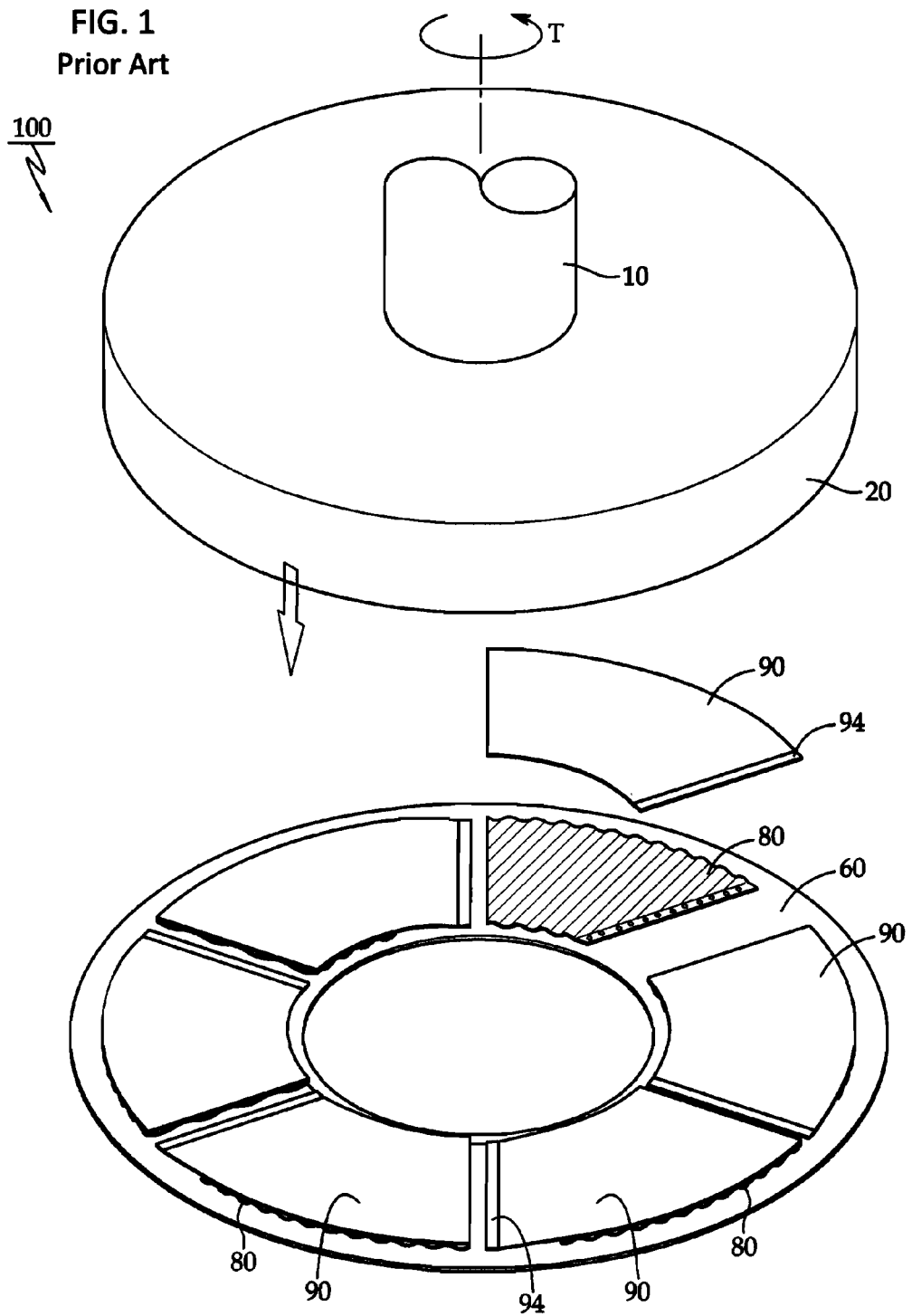
FIG. 1 is a view showing a general thrust foil air bearing structure.
Figure 2:
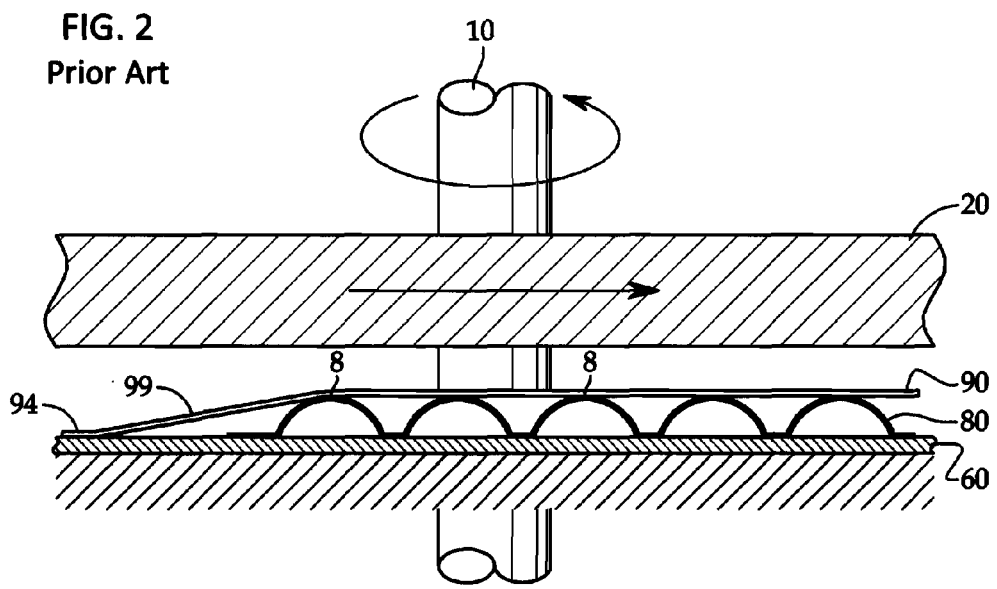
FIGS. 2 and 3 are views showing ramp structure and pressure profile in the general thrust foil air bearing.
Figure 3:
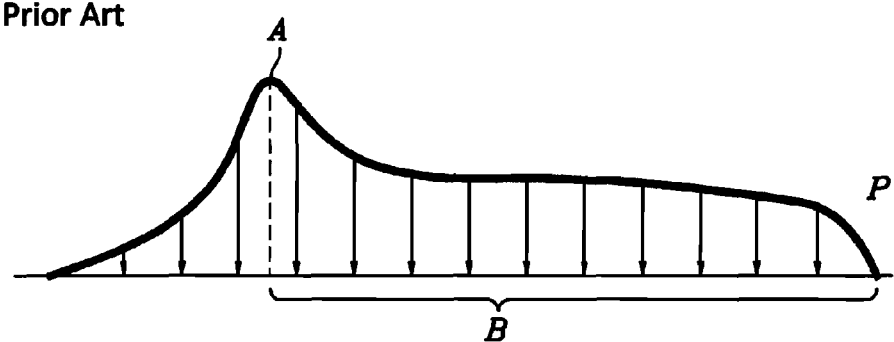
Figure 3:
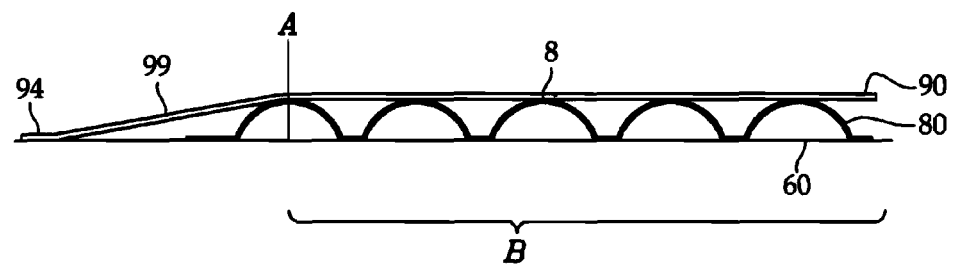
Figure 4:
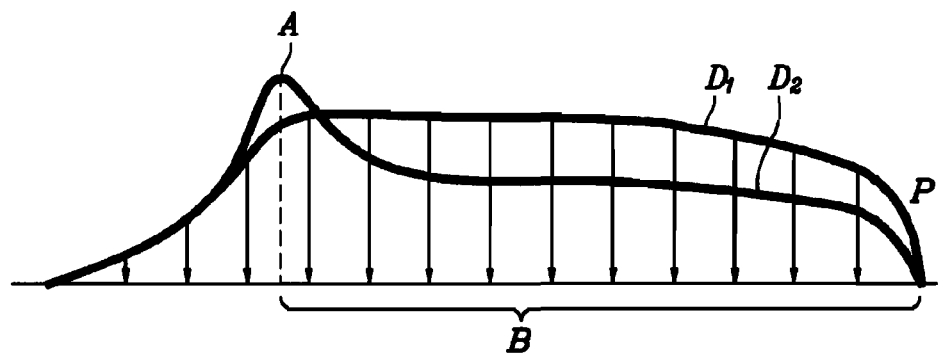
FIGS. 4 and 5 are views showing ramp structure and pressure profile in the thrust foil air bearing according to the present invention.
Figure 4:
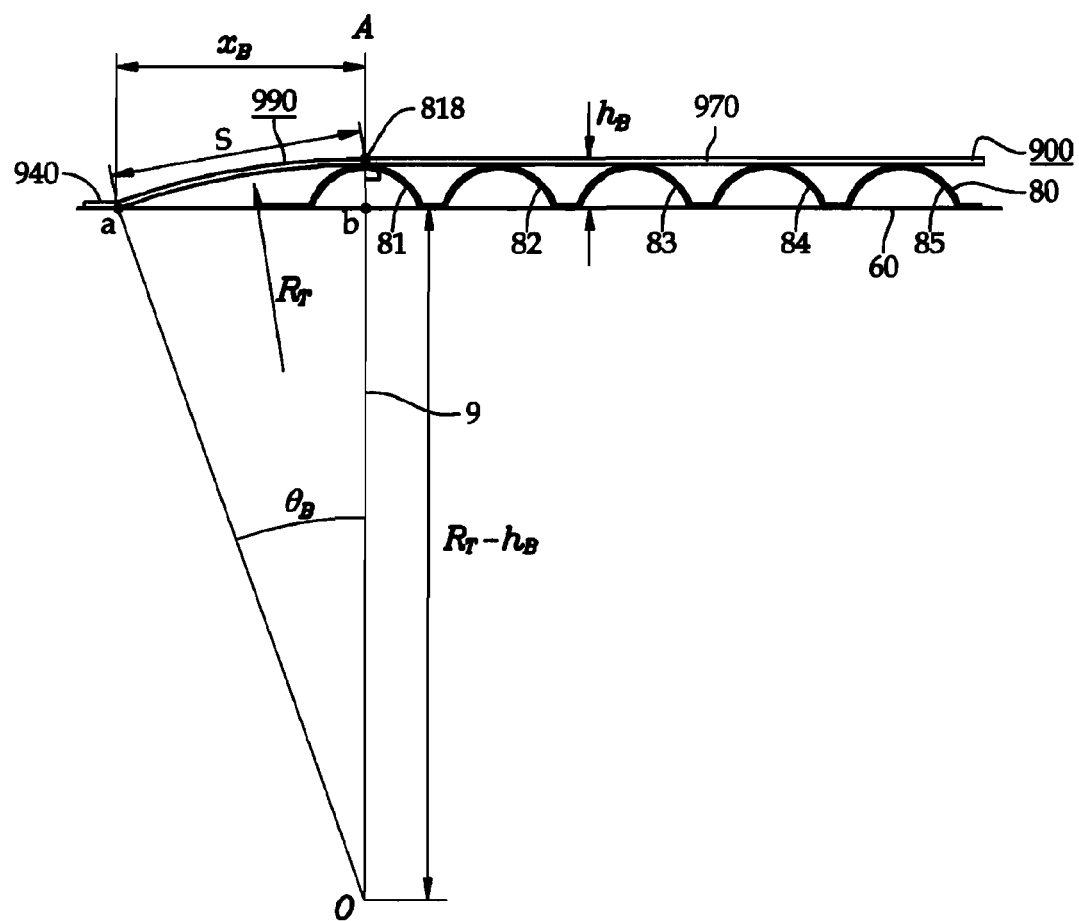

FIG. 4 shows structure of a ramp 990 of a top foil 900 according to the present invention. In this case, the bump foil 80 is arranged on the thrust plate 60 and the top foil 900 an edge 940 of which is attached to the thrust plate 60 by spot-welding is extended along the top of sequential bumps 81, 82, 83, 84 and 85 through the ramp 990.

The ramp 990 is formed between the edge 940 of the top foil 900 and the first bump 81 of the bump foil 80. FIG. 4 further shows a flat surface 970 of the foil at the height $H_B$ beyond the first bump.

According to the present invention, the ramp 990 forms a curvature the center O of which is located in the lower part thereof and contacts tangentially with the first bump 81 of the bump foil 80.

Accordingly, a point 818 where the ramp 990 contacts with the first bump 81 of the bump foil 80 vertically contacts with a vertical line 9 which bisects bump 81.

In this case, the curvature is determined by the following equation.

$$\theta_B = \tan^{-1}\left(\frac{x_B}{R_T - h_B}\right) \qquad \text{[Equation 1]}$$

$\theta_B$: Curvature
$x_B$: Horizontal distance of curve S and forming the offset distance between the both ends of the top foil curvature. The curve S is formed between an end point a toward the bump foil 80 at the edge 940 of the top foil 900 and the point 818 where the top foil 900 horizontally contacts with the first bump 81 of the bump foil 80.
$R_T$: Radius of the curvature
$h_B$: Height of the bump foil In this case, the $x_B$ is a design factor indicating mounting distance between the bump foil 90 and top foil 900 and an optimum value can be obtained by a customized design program. Also the $h_B$ can be empirically derived considering the load capacity and productivity of bearings.

With reference to FIG. 4, triangle Oab is a right angled triangle and the following equation is established to derive the above equation.

$$R_T^2 = (R_T - h_B)^2 + x_B^2 \qquad \text{[Equation 2]}$$

$$R_T = \frac{h_B^2 + x_B^2}{2h_B}$$

$$\therefore \theta_B = \tan^{-1}\left(\frac{x_B}{R_T - h_B}\right)$$

In this case, with reference to the pressure profile shown in FIG. 4, D1 is the pressure profile according to the present invention and D2 is that of the prior art. According to the present invention, although the pressure at point A where the ramp 990 terminates is lower than that of the prior art, the pressure does not drop as it enters area B and is kept uniformly and higher. Accordingly, the load capacity is enhanced.

Figure 5:
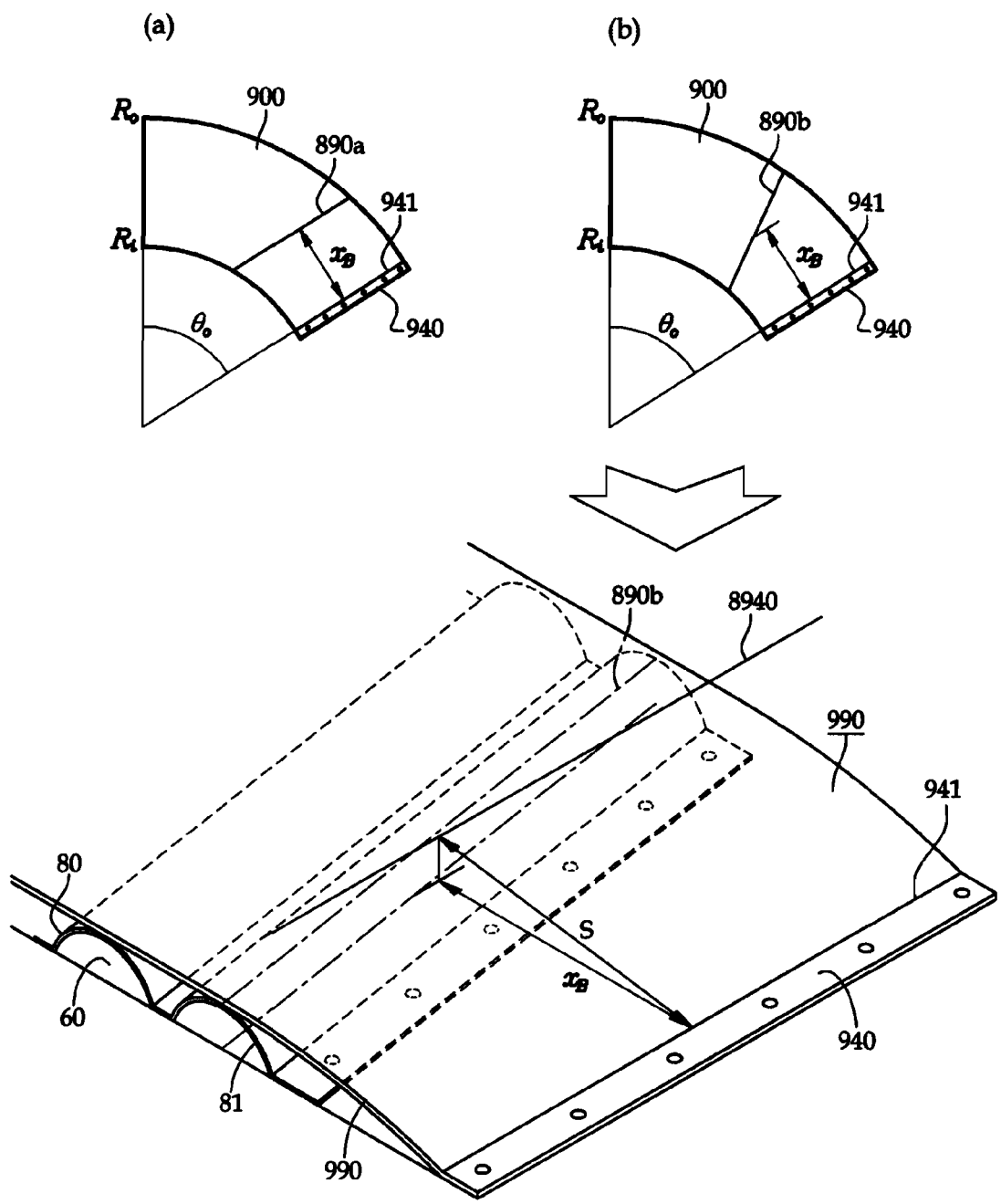

With reference to FIG. 5(a), if a horizontal contact line 890a connecting the points where the top foil 900 tangentially meets with the first bump 81 of the bump foil 80 is parallel to an edge line 941 connecting the end points toward the bump foil 80 at the edge 940 of the top foil 900, the $x_B$ is determined by the horizontal distance between the edge line 941 and the horizontal contact line 890a.

With reference to FIG. 5(b), if a horizontal contact line 890b connecting the points where the top foil 900 tangentially meets with the first bump 81 of the bump foil 80 is not parallel to an edge line 941 connecting the end points toward the bump foil 80 at the edge 940 of the top foil 900, the $x_B$ is determined by the horizontal distance of curve S. The curve S is formed between the edge line 941 and an edge parallel contact line 8940 which is parallel to the edge line 941 and contacts with the horizontal contact line 890b.

As described, the present invention defines the structure of the ramp curvature of the top foil. According to the present invention, the pressure profile is formed as the D1 in FIG. 4 and the total pressure increases and the load capacity is enhanced.

Therefore, it is understood that the purpose of the present invention is accomplished. The present invention is described with reference to the specific embodiments, but the invention is not limited thereto. Only the following claims will determine the scope of the invention.

What is claimed is:

1. A thrust foil air bearing having a thrust plate a surface of which is flat and a bearing disc opposite the thrust plate surface, the thrust foil air bearing further comprising:
    (a) a bump foil arranged on the thrust plate and comprising a plurality of bumps having respective tops; and
    (b) a top foil that is a single layer including:
        b1) an edge attached to the thrust plate;
        b2) a flat surface that horizontally extends to be parallel with the thrust plate surface along all the tops of the bumps of the bump foil in a direction of rotation of the bearing disc; and
        b3) a ramp connecting the edge and the flat surface,
    wherein the ramp forms a curvature, the curvature having a center located below the ramp and tangentially and horizontally contacts the top of a first bump of the bump foil, the curvature satisfying the following equation:

$$\theta_B = \tan^{-1}\left(\frac{x_B}{R_T - h_B}\right)$$

wherein $\theta_B$: Curvature $x_B$: Offset distance between the both ends of the top foil curvature $R_T$: Radius of the curvature $h_B$: Height of the bump foil.

2. The thrust foil air bearing as claimed in claim 1 wherein a contact line where the top foil tangentially and horizontally meets with the first bump of the bump foil is not parallel to an edge line at the edge of the top foil and the distance $x_B$ is determined by the horizontal distance of a curve formed between the edge line and an edge parallel contact line which is parallel to the edge line and contacts the contact line.

\* \* \* \* \*